(12) United States Patent
Wuestefeld

(10) Patent No.: US 7,590,345 B2
(45) Date of Patent: Sep. 15, 2009

(54) OPTOELECTRONIC PROTECTION DEVICE

(75) Inventor: Martin Wuestefeld, Sexau (DE)

(73) Assignee: Sick AG, Waldkirch (DE)

( * ) Notice: Subject to any disclaimer, the term of this patent is extended or adjusted under 35 U.S.C. 154(b) by 363 days.

(21) Appl. No.: 11/803,005

(22) Filed: May 11, 2007

(65) Prior Publication Data
US 2007/0280670 A1 Dec. 6, 2007

(30) Foreign Application Priority Data
May 20, 2006 (DE) .................. 20 2006 008 112 U

(51) Int. Cl.
G03B 15/03 (2006.01)
G03B 17/00 (2006.01)
G06K 9/00 (2006.01)
H04N 7/18 (2006.01)
H04N 5/225 (2006.01)
G06M 7/08 (2006.01)
G03B 17/02 (2006.01)

(52) U.S. Cl. .................... 396/155; 396/427; 396/537; 348/152; 348/375; 250/221; 382/103

(58) Field of Classification Search ................ 396/155, 396/427, 537
See application file for complete search history.

(56) References Cited

U.S. PATENT DOCUMENTS

| 6,469,734 | B1 | 10/2002 | Nichani et al. | ............. | 348/152 |
|---|---|---|---|---|---|
| 6,737,970 | B2* | 5/2004 | Wuestefeld et al. | ......... | 340/552 |
| 7,164,118 | B2* | 1/2007 | Anderson et al. | ........... | 250/221 |
| 7,200,246 | B2* | 4/2007 | Cofer et al. | ................. | 382/103 |
| 2002/0125435 | A1 | 9/2002 | Cofer et al. | ............. | 250/341.1 |
| 2004/0012715 | A1 | 1/2004 | Gin | ............................. | 348/375 |
| 2008/0285842 | A1* | 11/2008 | Plasberg et al. | ............. | 382/154 |

FOREIGN PATENT DOCUMENTS

| DE | 94 13 254 U1 | 2/1996 |
|---|---|---|
| EP | 1 303 603 A2 | 5/2003 |
| EP | 1 418 380 A1 | 5/2004 |
| WO | WO 02/41272 A2 | 5/2002 |
| WO | WO 2004/114243 A1 | 12/2004 |

* cited by examiner

Primary Examiner—Melissa J Koval
(74) Attorney, Agent, or Firm—Townsend and Townsend and Crew, LLP

(57) ABSTRACT

An optoelectronic protective device for providing switching signals when an unauthorized object is present in a passageway or an opening through a wall. A light source illuminates the opening, and a camera forms a picture of at least one of the wall surfaces defining the opening. A camera forms a picture of at least one of the wall surfaces and directs it onto a position resolving light receiver that generates picture signals for evaluation to determine if an unauthorized project is in the opening. The light source, the light receiver, the camera, as well as a control unit, are mounted in a housing that is configured to be secured to at least one of the wall surfaces of the opening so that it extends only negligibly into the opening, and the light source illuminates a spatial angle and the camera has an angular field of view that are sufficiently large so that objects having a predetermined minimum size present in the opening are reliably detected.

16 Claims, 2 Drawing Sheets

OPTOELECTRONIC PROTECTION DEVICE

RELATED APPLICATIONS

This application claims the priority of German patent application No. 202006008112.7 filed May 20, 2006, which is incorporated herein in its entirety by reference.

BACKGROUND OF THE INVENTION

This invention concerns an optoelectronic protective device for detecting the presence of unauthorized objects in access or passage openings, such as an opening through a wall.

A variety of such protective devices are known. They are used, for example, to take protective measures when persons approach a danger zone along a monitored path to prevent injuries and/or property damage.

There is a great variety of optoelectronic protective devices, which, based on the individual conditions that are encountered, can be a single-beam light barrier, a multi-beam light grid, a scanner or one of a variety of cameras. These optoelectronic protective devices monitor a line, a surface, or a space with light beams which are directed onto one or more light-sensitive receivers. When an object crosses one or more of such beams, it affects them; that is, it interrupts them, deflects them, weakens them or the like. This is detected by the light-sensitive receiver or receivers. Signals generated by the receiver are then processed in an evaluation unit so that the protective device can provide an appropriate status message, signal or the like.

In this context, the word "light" is not limited to visible light. For purposes of this application, the word "light" refers generally to electromagnetic radiation such as UV-light, IR-light, as well as visible light, which can be used by optoelectronic sensors, as is well known in the art.

A disadvantage of known optoelectronic protective devices is encountered when they have to monitor a passage or access opening because, due to their shape and/or size, they extend significantly into such an opening. This restricts the monitored space or area and can lead to dead zones in the opening where objects cannot be detected. This is particularly problematic for camera-based protective devices, because there will be a dead zone between the control unit and the wall surface behind the unit where objects cannot be seen by the camera

BRIEF SUMMARY OF THE INVENTION

It is therefore an object of the present invention to provide an optoelectronic protective device with a control unit that can be mounted inside an access or passage opening (hereafter typically referred to as "wall opening") which only negligibly restricts the free portion of the opening where objects can be reliably detected. As a result, any type of object having a predetermined minimum size which is present in the opening can be reliably detected.

The present invention attains this object by arranging at least one control unit, at least one light source, a light receiver and a camera in a housing adapted to be secured to at least one of the wall surfaces of the wall opening so that the housing extends only negligibly, that is, a short distance, into the opening. The light source illuminates a spatial angle and the camera has an angular field of view of sufficient sizes so that objects which are present in the opening and have a predetermined minimum size are reliably detected.

An advantage provided by the present invention is that due to the small distance over which the control unit extends into the wall opening, the reliably monitored area of the opening is only negligibly reduced. Accordingly, the control unit need not be mounted in front of or behind the wall opening, which is usually considered undesirable. As a result, the present invention does not require special structural modifications in the vicinity of the access opening, such as, for example, a recess into the wall surface of the opening where the control unit would otherwise have to be mounted.

The control unit of the present invention uses a light source with a sufficiently large spatial illumination angle so that it illuminates the entire opening, and at the same time using a picture-taking camera with a sufficiently large angular field of view ("angular view") to effectively cover the entire opening. These characteristics, that is, the flat housing shape, a large spatial illumination angle, and a camera with a large angular view, make sure that any desired object having at least a predetermined minimum size is reliably detected at any point inside the wall opening.

In a particularly advantageous embodiment of the invention, the housing for the control unit is configured so that its mounting surfaces are shaped to correspond to the shape of the wall surfaces of the opening in the vicinity of a corner formed by them. When viewed in the direction of the access opening, the control unit therefore has the shape of a triangle. For 90° corners of the access opening, the angular space illumination provided by the light source as well as the angular view of the picture-taking camera are according to the present invention somewhat larger than 90°, that is, between about 92° to 95°. This compensates for minor mounting tolerances without generating dead zones in the wall opening.

When the control unit has a corner configuration, it is preferred that the picture-taking camera is mounted at the center of a hypotenuse surface of the triangular housing. In this manner, the largest available depth in the housing is used for the largest component of the control unit, namely the camera.

In another embodiment of the present invention, the control unit is mounted on a flat surface of the access opening. In this configuration, the spatial illumination angle of the light source as well as the angular view of the camera in the plane of the access opening has an angle between about 180° and 185°. This arrangement is particularly well-suited when the height and width of the wall opening differ widely. For such an application, the control unit is arranged in a middle portion of the larger one of its width and height so that the distance of the wall surfaces to the control unit are reduced and not too large. This has the advantage that both the light density received by the light receiver and the positional resolution inside the entire wall opening do not diverge too much.

Another feature of the present invention is to provide the wall surfaces of the wall opening that are illuminated by the light source and within the angular view of the camera with a structured surface configuration in regard to its remission/reflection characteristics. The structured surface generates an intensity pattern on the position resolving light receiver that corresponds to the structured surfaces. Since objects that might be detected in the opening do not generate a corresponding intensity pattern, it is relatively easy for the control unit to distinguish between a wall surface of the opening and the presence of an unauthorized object in the angular view of the camera.

It is particularly preferred to apply a reflective layer to the wall surfaces of the opening that are illuminated by the light source and within the angular view of the camera. When the wall surface with the reflecting material is reproduced on or projected onto the light receiver, the light density is significantly greater. This in turn enhances the reliability of the optoelectronic protective device even in the presence of interfering outside radiation or a reduction in the light density due to other environmental factors.

In another embodiment of the invention, the reflector has an optically readable one-or two-dimensional code defined by reflector zones having differing degrees of reflection. The coding of the reflector shows up in the picture projected by the camera, and the resulting picture signal emitted by the light receiver is then transferred to the evaluation unit. For example, the evaluation unit can compare the coding of the reflector to a stored version thereof generated during a preceding learning mode of the evaluation unit. This makes it possible to recognize changes in the picture code being read out which are caused by the presence of an object in the wall opening. By using such coded reflectors, the protective device can further determine in which portion of the angular view of the camera the object is located.

In another advantageous embodiment of the invention, two control units are arranged in two adjacent or in two opposite corners of the wall opening. By using two control units simultaneously, which illuminate and monitor the wall opening from two different directions, it becomes possible to both detect the object and determine its relative position in the opening. For this purpose, the two picture signals from the two picture-taking cameras are suitably linked for generating the switching signal.

The simultaneous use of two control units in accordance with the present invention and the resulting availability of information concerning the position of an object can be used to identify the presence of certain objects at predefined positions within the wall opening as authorized objects. For example, bar-like raw material can be fed along predefined passageways to a dangerous machine without interfering in the machine operation due to the appearance of such material in the wall opening. At the same time, a dangerous penetration into the protected zone, for example of an arm or a hand of a person, is reliably detected, while the passage of the permitted bar-like raw material does not affect the operation of the machine.

DESCRIPTION OF THE PREFERRED
EMBODIMENTS

Figure 1:
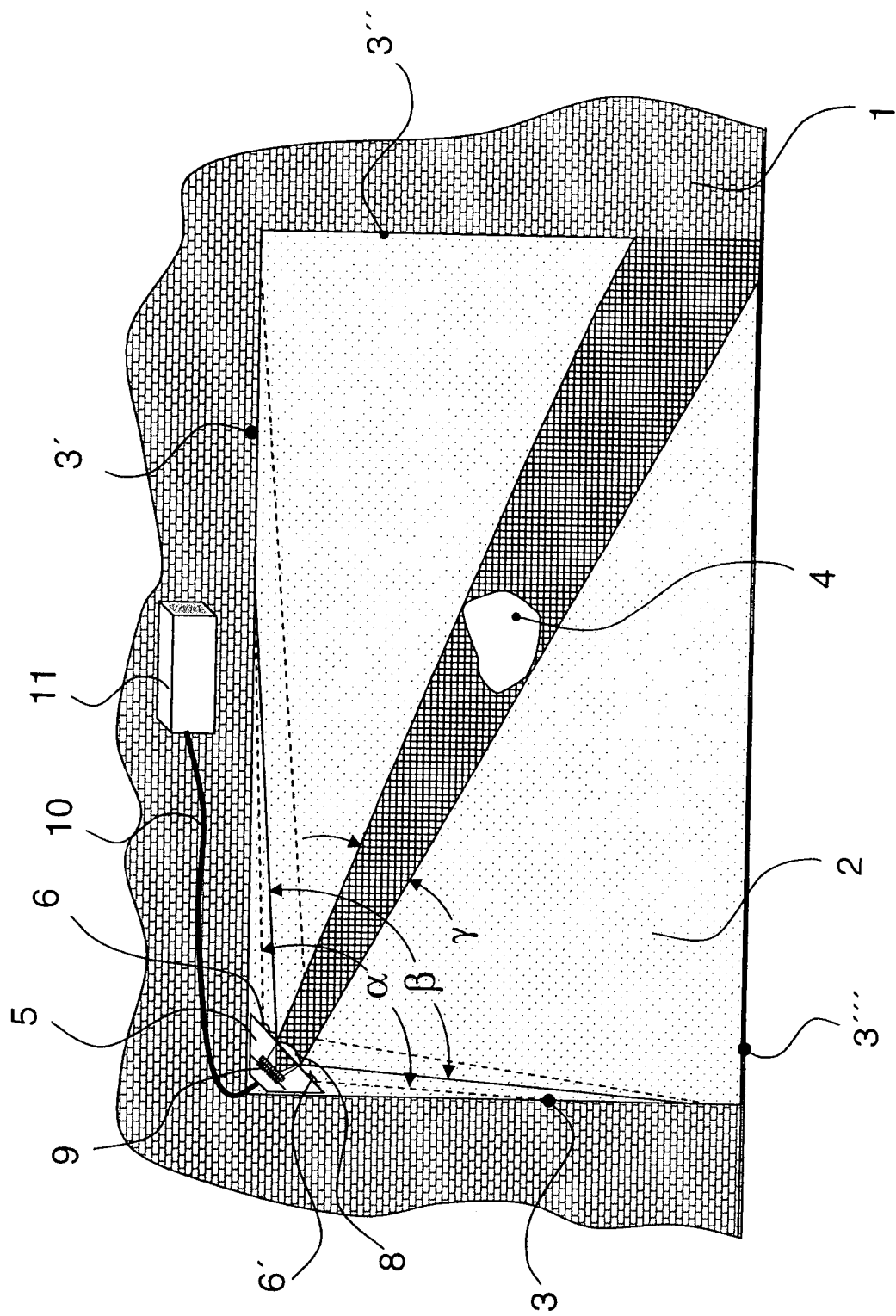
FIG. 1 is a side elevation of a passage opening provided with a control unit and mounted at a corner of the wall opening in accordance with the present invention.

Referring to FIG. 1, a separation wall 1 has a wall opening 2 that is bounded by wall surfaces 3, 3', 3" and 3'". Behind wall 1 and opening 2 might be a machine tool which, for example, executes a closing motion that may pose a danger for persons, or there may be a general danger zone, where, for example, a material-handling robot executes machine-controlled movements. To prevent injuries to persons or a shutdown of the machine, it is necessary to monitor opening 2 whether prohibited or unacceptable objects are within the opening. If, as shown in FIG. 1, an object 4 is within opening 2, a warning signal is generated and/or a shutdown of the machine takes place.

For this purpose, a control unit 5 is mounted in the upper corner of opening 2 as shown in FIG. 1. Control unit 5 includes a housing with a triangular cross-section in the plane of the drawing. Due to this housing configuration, control unit 5 can be attached to wall surfaces 3, 3' for positioning it directly in the corner so that the control unit protrudes only negligibly into opening 2. The control unit housing surface that defines the hypotenuse of the triangle is provided with two lighting sources 6, 6' for illuminating opening 2 as illustrated in FIG. 1. Lighting sources 6, 6' can be semiconductor light sources which have light generating means. However, in accordance with the present invention, several light sources can be arranged in a circle or along lines 4 in a two-dimensional matrix or in other desirable patterns in the housing of control unit 5. The lighting sources 6, 6' together direct a band of light over a spatial angle $\alpha$. The spatial angle $\alpha$ is greater than 90°. This illuminates wall surfaces 3" and 3'" and even partially illuminates the adjoining wall surfaces 3 and 3'.

The housing of control unit 5 further includes a picture-taking camera for projecting images onto position resolving light receivers. Its main components are a projecting objective 8 which is arranged at the center of the hypotenuse surface of the housing for control unit 5 and a position resolving light receiver 9 that is located in the focal plane of the projecting objective. The position resolving light receiver can, for example, use CMOS or CCD technology and includes a multitude of individual light receiving elements arranged in a single row or as a two-dimensional matrix defined, for example, by several receiver rows.

Projecting objective 8 has an angular view $\beta$ which is larger than 90°, and it generates a picture of wall surfaces 3, 3', 3" and 3'" on light receiver 9. A signal picture develops when the individual light receiving elements are serially read, which provides information how much light from which sight angle enters the camera. If, as shown in FIG. 1, an object is within the angular view $\gamma$, the picture received by one or more of the light receiving elements changes, which is reflected in the resulting signal picture. This signal picture from control unit 5 is fed via a data lead 10 to evaluation unit 11, which then evaluates it. In this manner, the optoelectronic protective device of the present invention can generate a required switching signal when unauthorized objects are present in a wall opening.

Figure 2:
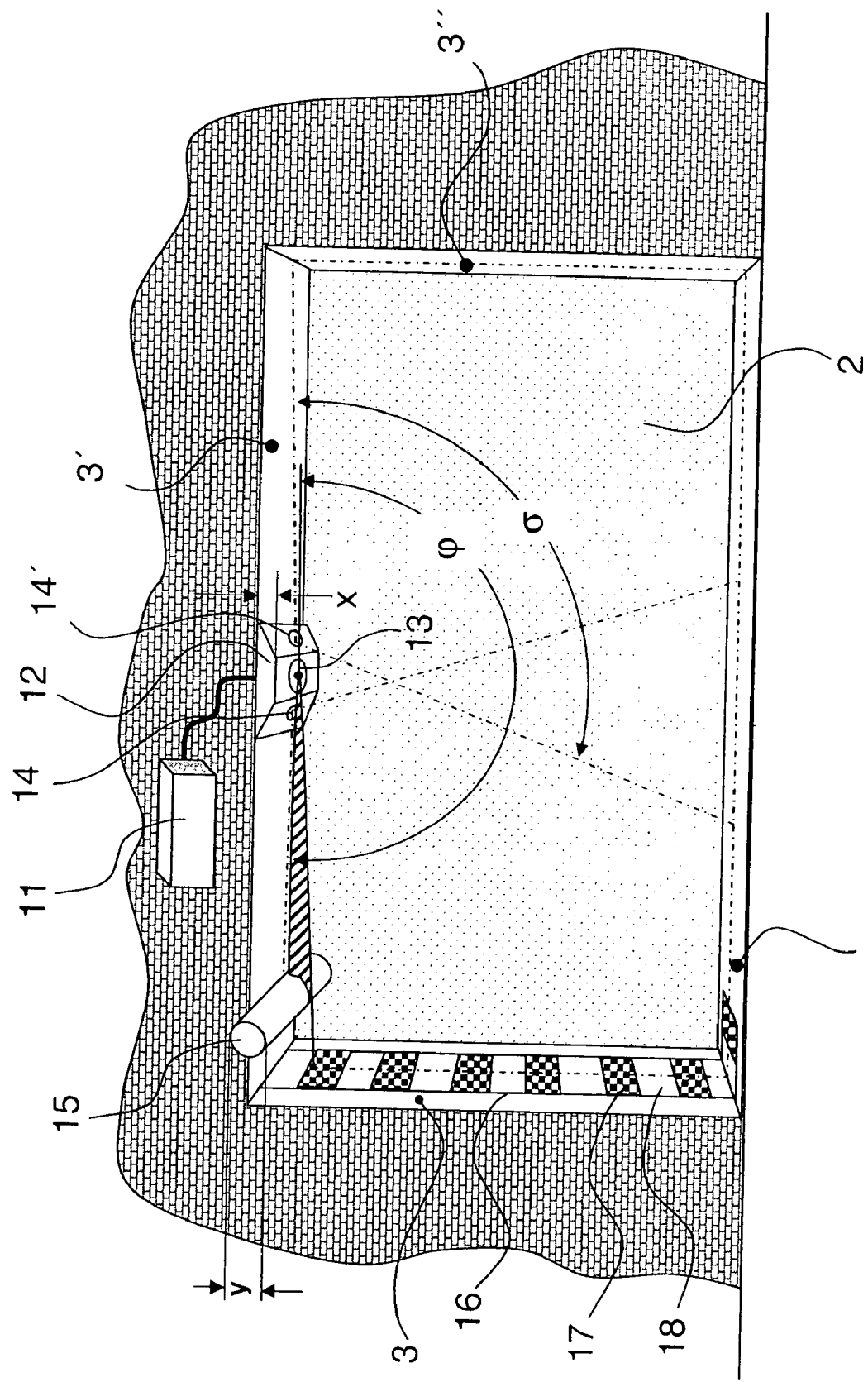
FIG. 2 is a perspective side elevational view of a wall opening with a control unit arranged in a middle portion above the passage opening.

FIG. 2 shows it is a perspective side elevational view of a control unit 12 arranged at about the middle of the wall opening 2 on the upper horizontal surface thereof. The housing of control unit 12 has a very low height x. As a result, control unit 12 projects only negligibly into opening 2. At the center of control unit 2 is also a picture-taking camera with a projecting objective 13. The projecting objective 13 has, contrary to objective 8 of FIG. 1, an angular view $\phi$ which is somewhat greater than 180° so that wall surfaces 3, 3" and 3'" are formed on a position resolving light receiver in a manner similar to that described in connection with FIG. 1. Here too, light sources 14, 14' are arranged on each side of projecting objective 13 for illuminating opening 2. Each of the two lighting sources 14, 14' illuminates a spatial angle $\sigma$ which is greater than 90°. This assures that a continuous light band is formed on wall surfaces 3, 3" and 3'".

FIG. 2 schematically illustrates both light sources 14, 14' as a single light source. However, it is within the scope of the present invention that this housing configuration can have lighting sources 14, 14' consisting of several lighting elements that can be arranged in a circular, line or two-dimensional matrix configuration in the housing of control unit 12. Control unit 12 is mounted directly on wall surface 3'. Due to its low height x, and its large angular view $\phi$, all objects having a predetermined minimum cross-section located within opening 12 are thereby detected. The exemplary object 15 shown in FIG. 2, which has a diameter y and touches wall surface 3, is reliably detected by control unit 12.

According to a particularly preferred embodiment of the invention, wall surfaces 3, 3" and 3'" are covered by a reflector 16 that is coded with zones that reflect the light to differing degrees. In the illustrated example, reflector 16 has alternating zones 17 and 18 with greatly differing degrees of light reflectivity. When the camera projects a picture of reflector 16 onto the individual light receiving elements of the position resolving light receiver, the pronounced differences in light densities can be detected. The resulting light density structure observed when reading the output from the light receiving elements reflects the light the intensity changes in the emitted picture signals as intensity modulations. This intensity-modulated picture signal from control unit 12 is fed to an evaluation unit 11. The evaluation unit 11 can then recognize the coding of reflector 16 if it was previously subjected to a learning mode. The generated signal picture is then compared to the stored version thereof. In this manner, a change in the read signal or code picture resulting from the presence of an object in the wall opening can be recognized. By using reflectors of this type, the presence of an object in the opening results in pronounced signal change, which greatly enhances the reliability with which the optoelectronic protection device of the present invention recognizes changes in the picture signals.

What is claimed is:

1. An optoelectronic protective device for providing a signal when an unauthorized object is present in an opening bounded by wall surfaces comprising a control unit, a light source for illuminating the at least some of the wall surfaces, a camera for forming a picture of at least one of the wall surfaces, an evaluation unit, at least one control unit including at least one light source for illuminating the opening, a camera, and a position resolving light receiver, the camera forming a picture of at least one of the wall surfaces on the light receiver, the light receiver being adapted to generate picture signals which correspond to the picture for evaluation by the evaluation unit, and a housing for the control unit, the light source, the light receiver and the camera, the housing being configured for securing it to at least one of the wall surfaces so that it extends only a short distance into the passage opening, the light source illuminating a spatial angle and the camera having an angular field of view of sufficient sizes so that objects which are present in the opening and have a predetermined minimum size are reliably detected.

2. An optoelectronic protective device according to claim 1 wherein the wall surfaces define a corner of the opening, wherein the control unit is arranged in the corner, and wherein the light source generates light that illuminates a spatial angle in the plane of the opening and the camera has an angular field of view which has a slightly larger angle than an angle between the two wall surfaces that define the corner where the control unit is located.

3. An optoelectronic protective device according to claim 2 wherein the housing has a triangular cross-section in the plane of the opening, wherein the camera is mounted at about a center of a hypotenuse of the triangle defined by the housing, and wherein a light source is arranged on each side of the camera.

4. An optoelectronic protective device according to claim 1 wherein the light source illuminates a spatial angle and the camera has an angular field of view in a plane of the opening that is between about 180° and 185°, and wherein the control unit is attached to a planar wall surface of the passage opening.

5. An optoelectronic protective device according to claim 1 wherein the at least one wall surface in the angular field of view of the camera has a structured surface with portions having differing degrees of reflectivity.

6. An optoelectronic protective device according to claim 1 wherein the at least one wall surface in the angular field of view of the camera includes a reflector.

7. An optoelectronic protective device according to claim 5 wherein the structured wall surface includes at least one of a one-dimensional and a two-dimensional code.

8. An optoelectronic protective device according to claim 6 wherein the reflector includes at least one of a one-dimensional and a two-dimensional code.

9. An optoelectronic protective device according to claim 2 including a second control unit mounted at another corner of the opening which is opposite the first-mentioned corner.

10. An optoelectronic protective device according to claim 2 including a second control unit mounted at another corner of the opening which is adjacent the first-mentioned corner.

11. An optoelectronic protective device according to claim 9 wherein the evaluation unit is adapted to combine at least portions of the picture signals from both control units for generating a proportional switching signal.

12. An optoelectronic protective device according to claim 10 wherein the evaluation unit is adapted to combine at least portions of the picture signals from both control units for generating a proportional switching signal.

13. An optoelectronic protective device according to claim 11 wherein the proportional switching signal is proportional to the respective angular views of the cameras, and wherein the evaluation unit is configured to partially deactivate a portion of the picture signals from both cameras from at least one zone within the respective angular view of at least one of the cameras.

14. An optoelectronic protective device according to claim 12 wherein the proportional switching signal is proportional to the respective angular views of the cameras, and wherein the evaluation unit is configured to partially deactivate a portion of the picture signals from both cameras from at least one zone within the respective angular view of at least one of the cameras.

15. An optoelectronic protective device according to claim 2 wherein the angular field of view and the spatial angle are greater than 90°.

16. An optoelectronic protective device according to claim 15 wherein the angular field of view and the spatial angle are in the range between about 92° to 95°.

* * * * *